UNITED STATES PATENT OFFICE.

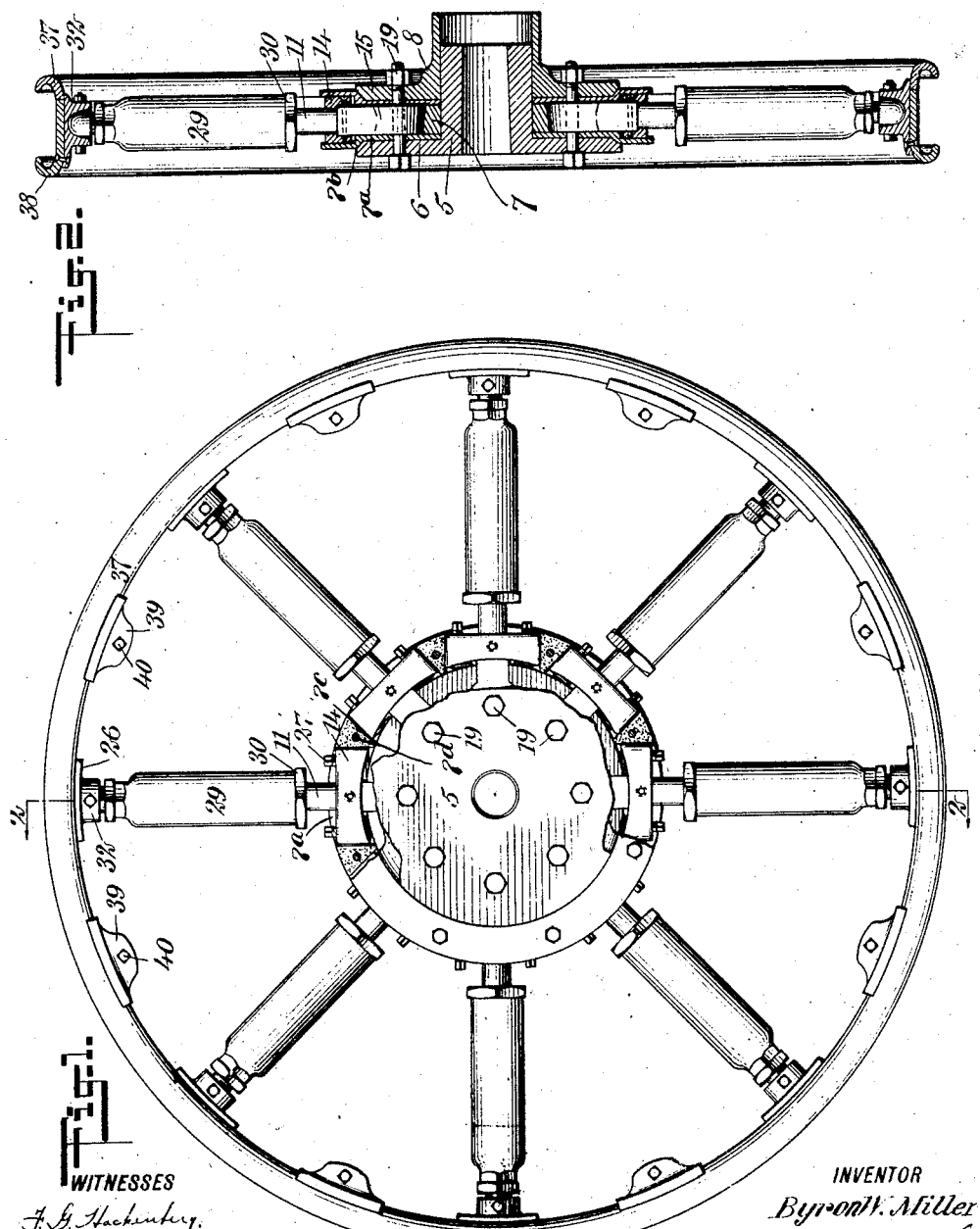

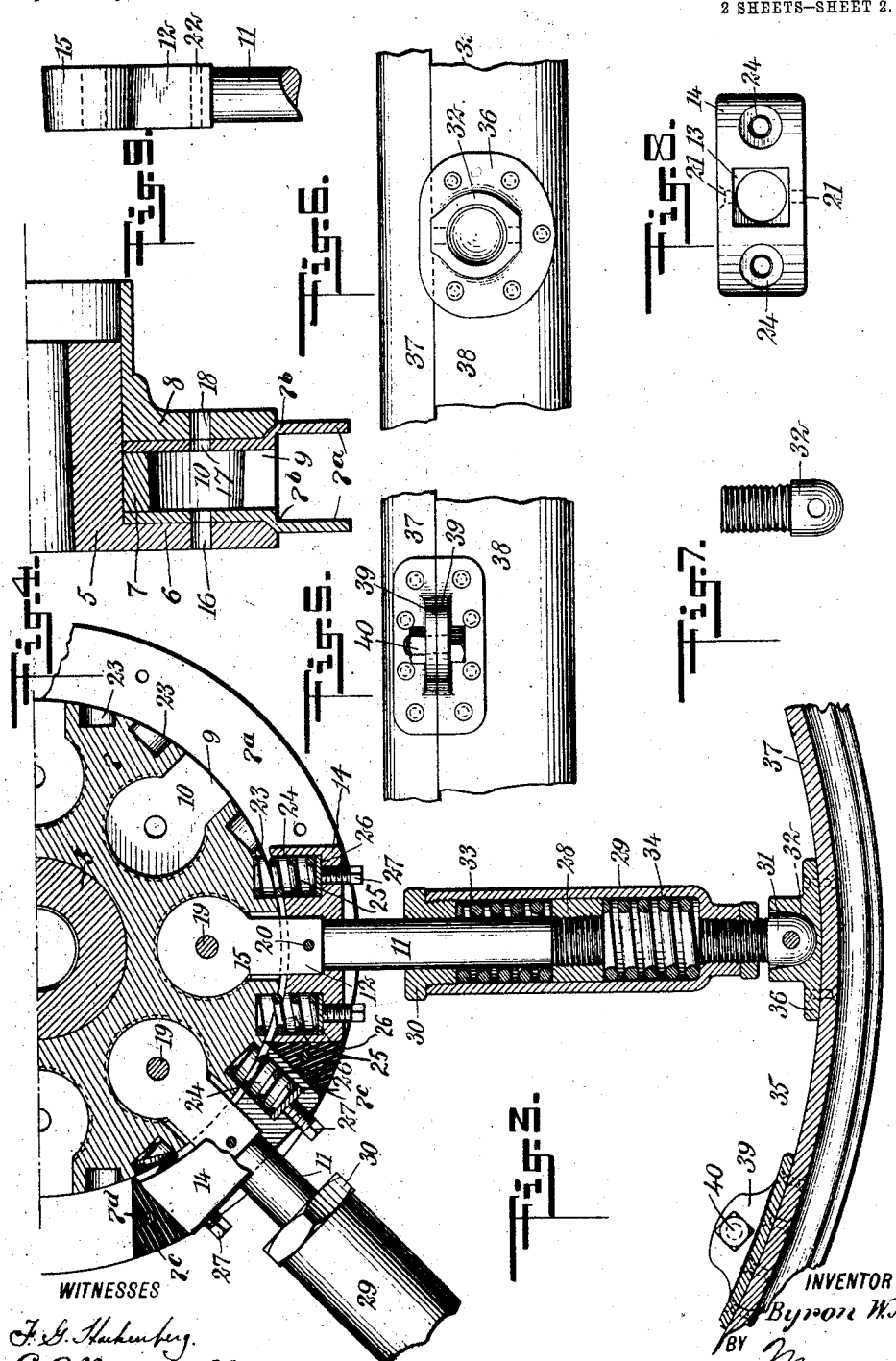

BYRON W. MILLER, OF COLORADO SPRINGS, COLORADO.

VEHICLE-WHEEL.

1,023,025.  Specification of Letters Patent.  Patented Apr. 9, 1912.

Application filed June 12, 1909. Serial No. 501,742.

*To all whom it may concern:*

Be it known that I, BYRON W. MILLER, a citizen of the United States, and a resident of Colorado Springs, in the county of El Paso and State of Colorado, have invented a new and Improved Vehicle-Wheel, of which the following is a full, clear, and exact description.

My invention relates to vehicle wheels, and it has for its object to provide one in which the spokes may be quickly replaced and held rigidly laterally.

Another object of the invention is to dispose the spokes in cylinders secured to the rim of the wheel, and to obtain the desired resiliency between the rim and the hub by means of springs.

Still another object of the invention is to construct the rim of two annular members which are clamped together, thereby holding the tire in position.

Other objects of the invention will appear in the following complete description.

In this specification I will describe the preferred form of my invention but it will be understood that I do not limit myself thereto, as I consider myself entitled to all forms and embodiments of the invention which may be held to fall within the scope of the appended claims.

Reference is to be had to the accompanying drawings, forming a part of this specification, in which similar characters of reference indicate corresponding parts in all the figures, in which—

Figure 1 is a side elevation of my invention; Fig. 2 is a sectional view on the line 2—2 of Fig. 1; Fig. 3 is an enlarged sectional view showing how the spokes are mounted with reference to the hub and the rim; Fig. 4 is a sectional view of the hub; Fig. 5 is an enlarged plan view of the rim, showing the flanges bolted together; Fig. 6 is a plan view of the rim, showing one of the sockets in which a head secured to a cylinder is pivoted; Fig. 7 is a view of one of the heads which is screwed in the cylinder and is pivoted in the socket; Fig. 8 is a plan view of one of the plates through the orifices in which a spoke is disposed; and Fig. 9 is a side elevation of the inner terminal of one of the spokes.

By referring to the drawings, it will be seen that a hub 5 is provided, which is preferably constructed of aluminum and is bored to fit the roller bearing of the spindle of the vehicle on which the wheel is to be mounted. The hub 5 has a flange 6, disposed against which there is a collar 7, which forms a part of the hub. Two annular plates 7ᵃ with central openings therein are slipped over the hub 5, one being disposed at either side of the collar 7, there being a face plate 8 which is adapted to be disposed over the hub 5 and against the outer plate 7ᵃ. In the collar 7, there are radially disposed recesses 9, the sides of which are formed by the annular plates 7ᵃ, the recesses 9 having enlarged annular terminals 10 which converge from one of the annular plates 7ᵃ to the other.

The spokes 11 have rectangular portions 12, which are adapted to fit in the recesses 9, which are rectangular in shape beyond their terminals 10, these rectangular portions 12 also fitting the rectangular openings 13 of the plates 14. The inner terminals of the spokes 11, beyond their rectangular portions 12, are annular in shape, and converge from one side to the other so that the inner spoke terminals 15 will fit snugly the terminals 10 of the recesses 9, and are adapted to be introduced into the said recesses laterally when the face plate 8 and the outer plate 7ᵃ have been removed, and will fit snugly in the recesses, as the sides of the terminals 10 converge more rapidly than the sides of the inner terminals 15 of the spokes 11, so that the spokes 11 will fit snugly in the recesses 9 and in their terminals. There are curious orifices 16 in the flange 6, and there are also orifices 17 and 18 in the plates 7ᵃ and in the face plate 8, which are in alinement with the orifices 16, so that the bolts 19 may be disposed through these orifices and hold the spokes 11 and the face plate 8 in position. The spokes 11 are secured to the plates 14 hereinbefore mentioned, by means of bolts 20, which pass through orifices 21 in the sides of the plates 14 and in orifices 22 in the spokes 11. There are recesses 23 in the hub, and there are also oppositely-disposed recesses 24 in the plates 14, springs 25 being provided, which are disposed in the recesses 24, each of the springs 25 extending into one of the recesses 23. Disks 26 are disposed in the recesses 24, and screws 27, which mesh in threaded orifices in the plates 14, are adapted to press the disks 26 against the springs 25.

The inner faces of the annular plates 7ª are set off at 7ᵇ beyond the flange 6 and the face plate 8 to form lateral supports for the plates 14, which are disposed snugly between the said annular plates 7ª and which rest against the shoulders therein which are formed at 7ᵇ. Between neighboring plates 14 and having the annular plates 7ª one at either side, are disposed rubber members 7ᶜ, which are wedge-shaped pins 7ᵈ being provided, which connect the rubber members 7ᶜ with the annular plates 7ª.

The spokes 11 have pistons 28 at their outer terminals which are disposed in the cylinders 29. The cylinders 29 have heads 30 with orifices therein through which the spokes extend, the heads 30 being screwed into the threaded terminals of the cylinders 29. The outer ends of the cylinders 29 have heads 31, being rounded and being disposed in sockets 32, in which they are pivoted, as shown in Fig. 3. Springs 33 are disposed between the heads 30 and the pistons 28, and springs 34 are disposed between the pistons 28 and the other terminals of the cylinders 29. The spokes and the cylinders are preferably constructed of steel, but it will be understood that they may be constructed of any other material, without departing from the scope of the invention which I have perfected. The springs 33 and 34, as they are disposed, suspend the hub from the top arch of the rim, giving the wheel the desired resiliency.

The rim 35 has secured thereon plates 36, in which the sockets 32 are disposed, this rim 35 being constructed of two annular members 37 and 38 which have flanges 39, the flanges 39 having orifices in which bolts 40 are disposed, to secure the annular members 37 and 38 together. This construction is provided to enable the operator to mount a tire on a wheel by removing the annular member 37 after the bolts 40 have been removed from the flanges 39. When the tire is in place, the annular member 37 is replaced and is secured by means of the bolts 40, as has been described.

In the operation of the invention, the springs 33 and 34 will give the wheel the desired resiliency, and it will be immaterial what character of tire is used on the wheel. The said springs 33 and 34 will also prevent any disagreeable rattling of the spokes 11 or their pistons 28 against the cylinders 29. The plates 14, which are pressed outwardly by means of the springs 25, will prevent any rattling of the spokes 11 against the hub 5, will hold the spokes yieldingly extended, will assist in keeping the spokes 11 in alinement, and will also give the hub elasticity when suddenly starting or stopping. As constructed, a light, durable and resilient wheel is provided, which will make it unnecessary for the users of motor cars to mount pneumatic tires on their wheels in order to attain the easy running which is so essential in the driving of pleasure cars.

It is understood that the wheel disclosed in this application may be used as a pulley or as a sheave in a block.

Having thus described my invention, I claim as new and desire to secure by Letters Patent:

1. In a wheel, a hub provided with radially disposed recesses extending out through the face of the hub, said recesses having enlarged circular inner ends and contracted outer ends whose walls are parallel, spokes having enlarged circular inner ends fitting in the circular portions of said recesses, a face plate secured to the hub and retaining the spokes in said recesses, plates through which the spokes pass and to which they are secured, and springs interposed between the plates and hub.

2. In a wheel, a hub provided with radial recesses having enlarged circular inner ends and rectangular outer ends, the sides of the circular portions of the recesses tapering, spokes provided with enlarged circular and tapering inner ends, and rectangular portions adjacent the circular ends, fitting in the said recesses, a face plate secured to the hub and retaining the spokes in said recesses, plates through which the spokes pass and to which they are secured, and springs interposed between the plates and hub.

3. In a wheel, a hub having radially disposed recesses which extend through one of its faces, the enlarged inner terminals of the recesses being circular in shape, the sides of the terminals converging from the said face of the hub, spokes having enlarged circular terminals which converge from one side to the other so that they will fit snugly in the terminals of the recesses, the enlarged terminals being provided with orifices, a face plate which is disposed against the said face of the hub and having orifices therein, there being orifices in the hub which are in alinement with orifices in the spokes and in the face plate, bolts disposed in the said orifices, a rim, and resilient means connecting the spokes to the rim.

4. In a wheel, a hub provided with radially disposed recesses having enlarged circular inner ends, spokes having enlarged circular inner ends fitting in the circular portions of the recesses and provided with orifices, a face plate disposed against the face of the hub and having orifices therein, the hub being provided with orifices in alinement with the orifices of the face plate and spokes, bolts in said orifices, means for taking up loose motion between the hub and spokes, a rim provided with sockets, cylinders pivoted in the sockets and in which the outer terminals of the spokes project, and means for holding the spokes yieldingly laterally and radially.

5. In a wheel, a hub having recesses, a rim, spokes pivoted to rim and hub, plates having recesses which are in alinement with the recesses in the hub, the plates also having orifices through which the spokes are disposed, the spokes being secured to the plates respectively, springs disposed in the recesses in the plates, the springs extending to the recesses in the hub, and means for compressing the springs.

6. In a wheel, a hub having recesses, spokes pivoted in the recesses, plates having orifices through which the spokes extend, the spokes being secured to the plates, means on opposite sides of the spokes for holding the plates yieldingly away from the hub, a rim, cylinders pivoted to the rim, the spokes being partly disposed in the cylinders, and means for holding the spokes yieldingly in a predetermined position relatively to the cylinders.

7. In a wheel, a hub having radially disposed recesses with enlarged inner terminals which extend through one of its faces, spokes having enlarged terminals which fit the terminals of the recesses, a face plate which is secured to the hub to prevent the lateral displacement of the spoke plates having orifices through which the spokes extend, the spokes being secured to the plates, means on opposite sides of the spokes for holding the plates yieldingly away from the hub, a rim, cylinders pivoted to the rim, the spokes having their outer terminals disposed in the cylinders, and means for holding the spokes yieldingly in a predetermined position relatively to the cylinders.

8. In a wheel, a hub having an annular flange and a collar mounted thereon, two annular plates mounted on the hub, one at either side of the collar, there being radially disposed recesses in the collar, spokes disposed in the recesses of the collar, plates having orifices through which the spokes are disposed, means to hold the plates yieldingly relatively to the collar, the said annular plates resting against the sides of the said plates, resilient members disposed between adjacent plates, a rim, and a yielding connection between the spokes and the rim.

In testimony whereof I have signed my name to this specification in the presence of two subscribing witnesses.

BYRON W. MILLER.

Witnesses:
CORNELIUS E. KENNEDY,
CLAUDE E. CHERUM.